No. 690,446. Patented Jan. 7, 1902.
L. C. LEVY.
EDUCATIONAL APPLIANCE.
(Application filed July 9, 1901.)
(No Model.)
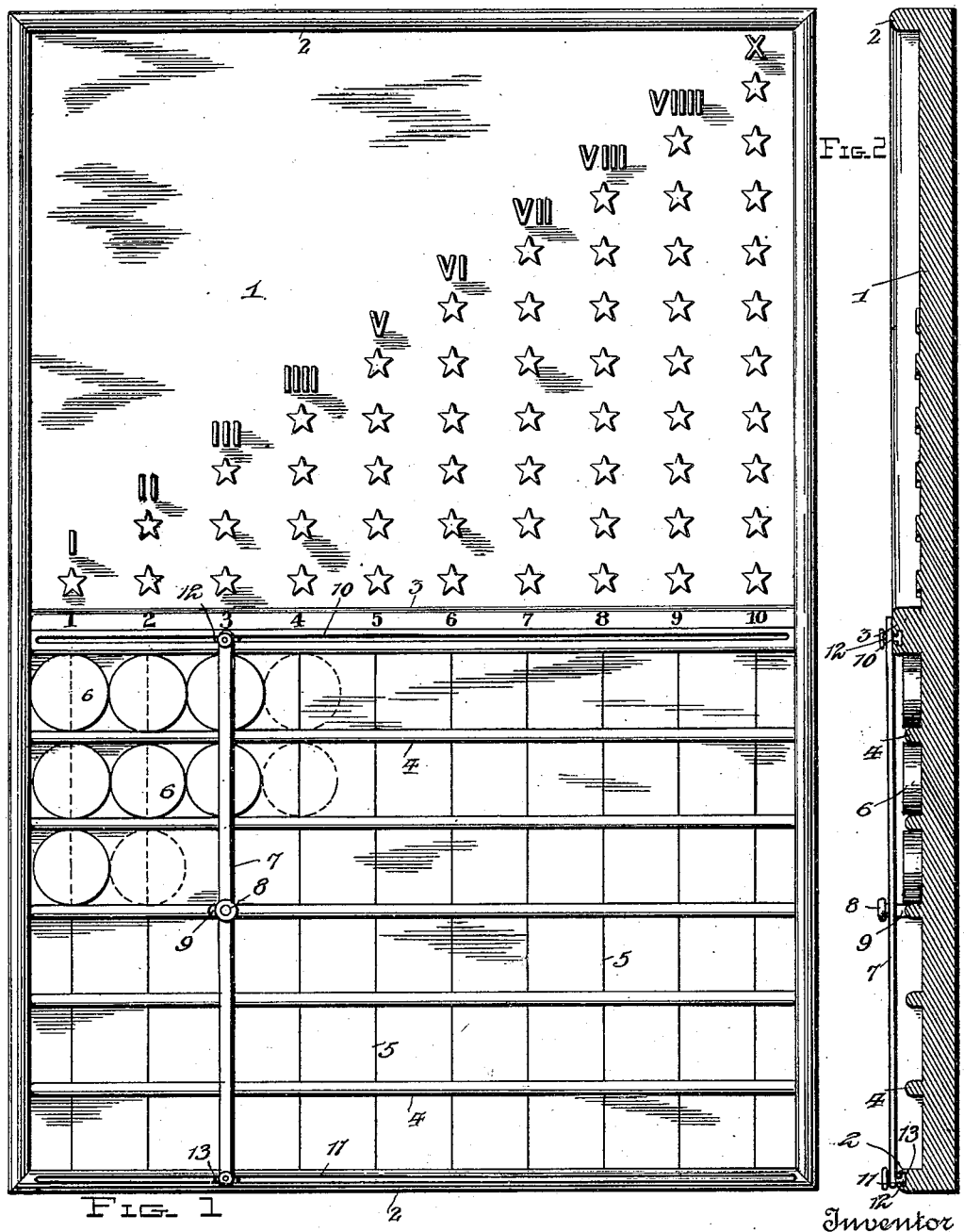
Witnesses
Inventor
Leopold C. Levy,
By
Attorney

UNITED STATES PATENT OFFICE.

LÉOPOLD CERF LEVY, OF BLÉNOD-LÉS-PONT-À-MOUSSON, FRANCE.

EDUCATIONAL APPLIANCE.

SPECIFICATION forming part of Letters Patent No. 690,446, dated January 7, 1902.

Application filed July 9, 1901. Serial No. 67,650. (No model.)

*To all whom it may concern:*

Be it known that I, LÉOPOLD CERF LEVY, a citizen of the Republic of France, residing at Blénod-lés-Pont-à-Mousson, France, have invented a new and useful Educational Appliance, of which the following is a specification.

This invention relates to a novel educational appliance, and has for its object to provide means for the objective instruction of pupils in arithmetic. In mastering the fundamental operations necessary to the solving of mathematical problems it is ordinarily deemed to be necessary to memorize tables of addition, multiplication, &c., and while this is comparatively easy for some pupils others find it exceedingly difficult, if not impossible, for the reason that some qualities of mentality are incapable of a comprehensive grasp of any presentation of thought which is incapable of objective demonstration.

It is therefore the object of this invention to provide a simple and inexpensive device or appliance which may be employed for the purpose of making the study of arithmetic wholly objective, and thereby permit the teacher to dispense with memorizing exercises for impressing the fundamental operations or principles of mathematics upon the minds of the pupils. This end is attained by providing a base or board of a convenient size for support upon the desk of the pupil and equipped with rows of stationary objects arranged progressively across the board at the upper end thereof, the number of objects in each row being indicated above the rows in Roman notation and below them in Arabic notation, these portions of the appliance constituting an objective key designed for the purpose of familiarizing the pupil with the notations and for imparting constantly an objective impression of the number of objects represented by each character. Below this objective key the board is provided with a checkered surface defining series of squares within which the pupil arranges a number of objects—as, for instance, small disks—in accordance with the method to be described, the arrangement of these disks with respect to the objective key being significant of certain results which are at once apparent to the pupil.

In the accompanying drawings, in which I have endeavored to illustrate the appliance, Figure 1 is a plan or face view of the educational appliance, and Fig. 2 is a sectional view thereof.

In the preferred embodiment of the device it comprehends a board or base 1 of a size convenient for handling by the pupil, surrounded by a raised bead 2, extending along the side and end edges, as shown. The face of the board is divided into two separate portions by a transverse strip 3, upon which are imprinted at equidistant intervals Arabic notations ranging from "1" to "10." This strip constitutes a portion of what I shall term the "objective key" of the apparatus, and for the purpose of impressing upon the mind of the pupil the objective significance of each numeral the space above the strip is provided with rows of objects—as, for instance, stars raised in relief above the face of the board. These objects are arranged in vertical rows of progressive values, the number of stars in each row corresponding to the numeral above which the row is located. Above the rows of stars are placed, preferably in relief, the Roman notations, which, like the numerals, correspond to the number of objects in the rows over which they appear, and for convenience in instructing the pupil, as will hereinafter more fully appear, the number "4" is indicated in the Roman notation by four dashes or units instead of the usual notation "IV." The same variation exists in denoting the number "9," which is indicated by "VIIII" instead of "IX," as usual. The rows of stars or other objects disposed permanently upon the board in connection with the Roman and Arabic notations constitute, as stated, the objective key, and by reason of the fact that the objects and certain of the characters are raised in relief from the face of the board the apparatus is capable of being utilized for teaching the blind, the significance of the key being made apparent to them by touch in a manner well understood in this branch of instruction.

Below the transverse strip 3, upon which the Arabic notations are imprinted, these also being raised in relief, if desired, are located at equidistant intervals transverse strips or rails 4, which, in connection with vertical lines 5 in alinement with the notations and rows above, subdivide the lower portion of the board into a series of squares, each series comprehending ten lines of subdivision, inasmuch as ordinary arithmetical calculations are conducted in blocks or series of tens. The transverse rails 4 are designed for the guidance and partial support of the movable objects or disks 6, which are intended to be manipulated upon the subdivided portion of the board in a manner having special relation to the objective key, which assists the pupil in arriving at a proper impression of the result attained by the manipulation of the disks, it being evident that the disks may be readily rolled along the rails and positioned in any of the squares or upon any of the lines desired.

In order that the utility of the apparatus described may be apparent, it may be well to enter into a short discussion of the method, of its use, and its relation to the scheme of instruction of which it forms a part. In order that the significance of the key may be appreciated by the pupil in the subsequent manipulation of the movable objects, he is first taught to count at least as far as ten, and the significance of the numbers counted is preferably stamped upon the mind of the child by a recital of the probable origin of the Roman notations constituting a portion of the key—that is, the child is taught that men first counted upon their fingers, and when at a later date they began to write numbers they indicated the numeral "1" by a dash representing one finger, two dashes for two fingers, and so on up to five, which is indicated by a "V," supposed to constitute a coarse outline of the raised open hand, which had originally been employed as the designation of this number, which meant all the fingers of the hand. In a similar manner the child is impressed with the idea of the numbers ranging from five to ten being represented by "V" standing for all the fingers of one hand and additional dashes representing the addition of certain other fingers of the other hand until the number "10" is reached, which is indicated by "X," supposed to correspond to both hands crossed one upon the other. In this manner the child is interested objectively and is familiarized with the Roman notations and with the number of objects constituting the value of each. As the pupil becomes familiar with each number he is made to express it by placing disks in a row upon the demonstrating portion of the board. Suppose the number is "4" and the child has been objectively taught that four is representative of four fingers of the hand corresponding to the Roman notation. His familiarity with this number is demonstrated by placing four disks upon the board, one on each of the first four lines, having done which his eye is naturally elevated to the row of objects above the last disk, and at the top of that row he observes the Roman notation with which he has become familiar, and is thus apprised as to the accuracy or inaccuracy of the demonstration effected by him and at the same time he is enabled to count the permanent objects in the row of the key, which objects must of course correspond in number to the number of disks placed by him upon the board.

The arrangement of the Arabic notations at the foot of each line of objects and in a position corresponding to the Roman notations with which the pupil is familiar enables the teacher to impress upon the child the significance of the Arabic characters with little if any special attention, and the result is that by the time the child is familiar with the groups of objects ranging from one to ten he will appreciate the significance of the entire objective key of the apparatus.

The usefulness of the device is even more apparent when we consider the method of teaching addition, subtraction, multiplication, and division. A problem is given—as, for instance, "John has three apples, his brother has four apples, and his sister has two apples. How many apples have they together?" The pupil places three disks above the upper rail 4 upon the first, second, and third lines, representing John's apples, four disks in a similar manner on the second bar or rail representing his brother's apples, and two disks on the third bar to denote his sister's apples. It will be observed now that the child has not undertaken addition, but has simply made use of his ability to count three, four, or two units, as the case may be. Having located each of these groups in separate disassociated relation, the pupil is now told to add the second group in rotation following the three disks on the first bar, and these are in turn followed by the two disks constituting the third series and representing the sister's apples. We now have the entire number of objects in rotation, the last of which falls under the row in the objective key containing nine permanent objects and designated by the Roman notation "VIIII" and the Arabic numeral "9," so that the child by the display of permanent objects and by a comparison of their number with the disks is able to verify the result attained and is apprised of that result and of its proper expression by the presence of both the Roman and Arabic notations.

As an example in subtraction the following will suffice: "Joe has seven cents. He spends three cents for a toy. How much remains to him?" The pupil places over the first bar seven disks, representing the amount of money possessed before the purchase of the toy. Three of the disks are now removed to represent the amount expended for the toy, and it is at once apparent by the objective demonstration afforded by the key that there remains to Joe the sum of four cents.

The principle of multiplication is demonstrated in much the same manner as the principle of addition. For example: "A man rents a room at six dollars a month, paying three months' rent in advance. How much does he pay?" Six disks are placed upon the first bar for the first month's rent. Six more are placed on the second bar for the second month's rent, and the third month's rent is indicated by six disks on the third bar, the placing of each of these series being facilitated, it will be observed, by the objective key. The pupil is now made to understand that he has three times six disks, each of which represents a dollar paid by the man for rent, and that the problem involves the ascertaining of the total number of dollars expended. In the manner similar to the demonstration of addition the disks upon the second and third bars are now placed in rotation following the disks upon the first bar and the pupil discovers that he has one series of ten and eight units over, each of these facts being demonstrated by the key and signifying to the mind of the pupil that the result of the multiplication is eighteen dollars paid in advance for three months' rent.

For the demonstration of division the following example will suffice: "Six boys have to share between them twenty-four balls. How many balls does each boy receive?" We first place twenty-four disks in rotation on the first three bars, indicating a total of two series of tens and four additional units, indicating "24," the total number of balls. We now remove the disks, keeping them in our left hand. We now place upon the first bar six disks, representing one ball for each boy. In a similar manner we place six disks on the second bar, six disks on the third bar, and six disks on the fourth bar, and as all of the disks have now been consumed we count vertically and find that each boy receives four balls. Another way in which this might be demonstrated in a manner to cause the objective key to indicate more clearly the result would be to place six disks vertically upon the first line, representing one ball for each of the six boys; then six disks on the second line, representing two balls for each of the boys; then in similar manner six disks on the third line and six on the fourth, after which, the disks being all consumed, it will appear by reference to the adjacent row of objects and the numerical designation thereof that each boy received four balls.

When the apparatus is intended particularly for the use of blind pupils, I provide in addition to the characteristics already noted a sliding indicator-bar 7, disposed vertically or longitudinally of the board and having its opposite ends slidably connected to the strip 3 and the lower or bottom end strip of the raised bead 2. This indicator-bar is provided for the reason that the lines 5 of the apparatus are not sensible to the touch, and a blind pupil would not therefore be enabled to readily determine what character or designation of the objective key was disposed directly over the last disk placed by him upon the rail. By the use of this indicator-bar, however, the sightless pupil may by locating the bar over the last disk be provided with a guide which will lead the fingers to that objective designation which is the key to his problem. To facilitate the movement of the bar 7 across the lower part of the board, the said bar is provided with a handle or knob 8, having a shank 9, which preferably rests upon one of the rails 4. The connection of the opposite ends of the bar with the strip 3 and the bead 2 is preferably effected by forming the strip and bead with grooves 10 and 11 for the reception of the slides 12 and 13, carried by the board.

From the foregoing it will appear that I have produced a simple and ingenious educational apparatus, enabling the fundamental operations of arithmetic to be objectively taught without requiring the pupil to memorize tables or rules and which may be employed with equal facility for the teaching of sightless pupils; but while the present embodiment of the invention is believed at this time to be preferable I do not wish to limit myself to the precise structural details defined, as they may obviously be varied to a greater or less extent within the scope of the invention. For instance, while the device as illustrated will be used by the individual pupil a much larger appliance, arranged to be supported in a somewhat different manner—as, for instance, upon an easel—will be utilized by the teacher in demonstrating the use of the device for the initial instruction of the pupils.

What I claim is—

1. An educational appliance comprising a board or base provided with transverse series of subdivisions for the reception of movable objects, and with vertical rows of permanent objects constituting an objective key indicative of the numerical value of the series of movable objects placed within the subdivisions.

2. An educational appliance comprising a board or base provided with a plurality of transverse rails for the reception of movable objects, and vertical lines intersecting the rails, and with vertical rows of permanent objects disposed directly above the vertical lines, each of said rows of permanent objects being provided with a numerical designation corresponding to the number of objects in the row, and constituting an objective key indicative of the number of movable objects upon the rails.

3. An educational appliance comprising a flat base surrounded by a bead to prevent the escape of movable objects, a transverse strip disposed across the face of the base and bearing numerals "1" to "10," transverse rails extending in parallel relation across the base below the strip and intersected by vertical lines extending from the numerals, vertical rows of permanent objects disposed above the numerals and corresponding therewith in numerical value, and corresponding Roman notations above the rows of permanent objects, whereby said permanent objects, numerals and notations constitute an objective key indicative of the numerical value of groups of movable objects placed upon the transverse rails.

4. An educational appliance comprising a flat base or board provided with vertical rows of permanent objects constituting an objective key, a portion of said board being formed with a series of subdivisions for the reception of movable objects, and an indicator-bar mounted to move over the subdivided portion of the board and designed to indicate the relation of the objective key to the movable objects.

5. An educational appliance comprising a flat base provided with a series of transverse rails or guides for movable objects and with an objective key indicative of the numerical value of series of movable objects placed upon the rails or guides, and a movable indicator-bar disposed transversely of the rails or guides and designed to indicate the relation of the objective key to the movable objects.

6. An educational appliance comprising a board or base having a tranverse strip disposed across the face thereof, several vertical rows of permanent objects constituting an objective key and located at one side of the transverse strip, a series of transverse rails or guides located at the opposite side of the transverse strip and designed for the reception of movable objects, and an indicator-bar having a slidable connection at its opposite ends with the board or base, and designed to be moved transversely over that portion of the board provided with rails, whereby the relation of the objective key to the movable objects may be determined without the use of the vision.

7. An educational appliance comprising a flat base surrounded by a bead, a transverse strip disposed across the face of the base and bearing the numerals "1" to "10," transverse rails extending in parallel relation across the base below the strip, vertical rows of permanent objects disposed above the numerals and corresponding therewith in numerical value, corresponding Roman notations above the rows of permanent objects, whereby said permanent objects, numerals and notations constitute an objective key indicative of the numerical value of groups of movable objects placed upon the transverse rails, and an indicator-bar disposed longitudinally of the base and having slidable connection at its opposite ends with the transverse strip and with the bead at the lower end of the base, said indicator-bar being provided with a handle to facilitate the shifting thereof transversely of the base to indicate the relation of the objective key to the groups of movable objects.

In testimony that I claim the foregoing as my own I have hereto affixed my signature in the presence of two witnesses.

LÉOPOLD CERF LEVY.

Witnesses:
BISCH JACQUES,
HANSON EUGENE.